Jan. 15, 1924.

F. A. BAUM

CASTER

Filed July 12, 1922

Witnesses
Charles E. Greene

Inventor
Frank A. Baum
By
Attorney

Jan. 15, 1924.

F. A. BAUM 1,480,851

CASTER

Filed July 12, 1922    2 Sheets-Sheet 2

Witnesses
Charles E. Greene

Inventor
Frank A. Baum
By
Attorney

Patented Jan. 15, 1924.

1,480,851

UNITED STATES PATENT OFFICE.

FRANK A. BAUM, OF HAMILTON, OHIO.

CASTER.

Application filed July 12, 1922. Serial No. 574,407.

*To all whom it may concern:*

Be it known that I, FRANK A. BAUM, a citizen of the United States of America, residing at Hamilton, Butler County, Ohio, have invented certain new and useful Improvements in Casters, of which the following is a full, clear, and exact description.

This invention relates to casters, and more particularly to an improved form of caster for use on furniture, factory trucks and the like.

This invention constitutes an improvement on the invention disclosed in the patent to Frank A. Baum, No. 1,181,631, dated May 2, 1916, and while some of its features are applicable to one wheel casters, it relates particularly to that class of casters in which two wheels are employed; and one of the principal objects of the invention is to provide, in a caster of the general type disclosed in the above referred to patent, a two wheel caster in which the wheels are mounted so that they will automatically compensate for irregularities in the floor, and will maintain fair bearing on the floor, despite irregularities therein.

Other objects and advantages of the invention will be apparent from the description thereof set out below when taken in connection with the accompanying drawing.

In the drawing in which like characters of reference designate like parts throughout the several views thereof;

Figures 1, 4:
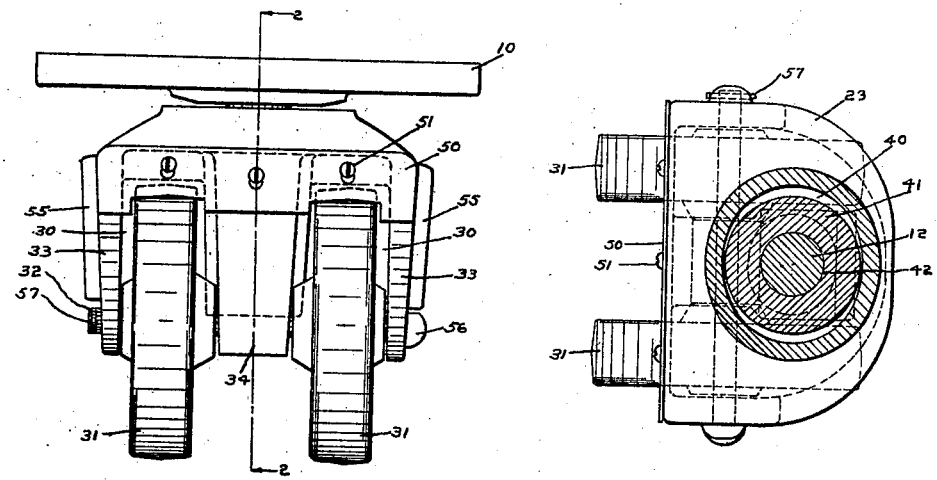
Fig. 1 is a front elevational view of a two wheel caster constructed in accordance with this invention.
Fig. 4 is a horizontal sectional view through the upper part of the caster, along the line 4—4 of Fig. 2.

The type of caster shown in Figs. 1 through 5, which in order to accommodate it to the carrying of heavy loads is provided with two wheels instead of one, is substantially identical in many of its details of construction with the caster shown in the above referred to patent. This caster comprises as one principal element a plate 10, which is constructed for attachment to a piece of furniture, a factory truck, or the like. Any suitable means for attaching this plate may be utilized, although as shown, in dotted lines, by the numeral 11, in Figs. 2 and 3, holes are provided for receiving screws or bolts for accomplishing this attachment.

The plate 10 is provided with a downwardly projecting stem 12, which is rigidly secured to the plate. If desired this stem 12 may be cast integral with the plate, but preferably its upper end 13 is made somewhat smaller in diameter than the body of the stem, and is constructed for positioning within a centrally arranged opening 14, in the plate, a bearing shoulder 15 being provided against which the lower face of the plate 10 rests, the upper end of the stem being beaded over as shown at 16 to thus clamp it firmly and rigidly to the plate, so that the two parts constitute in effect a single member. The lower end 20 of the stem is substantially hemispherical in shape, and is adapted to seat against a correspondingly shaped seat 21 which constitutes the bottom of a pocket or cup 22, which is formed within the housing member 23. When the caster is in assembled position the stem 12 extends into the pocket 22 with its hemispherical lower end resting upon the seat 21, the two members being held in this assembled position by means of a pin 24 which extends through suitable aligned passages 25 within the housing member with its intermediate portion positioned in the groove or cut away porton 26 in the lower end of the stem. As shown particularly in Fig. 5, the pin 24 is preferably tapered the passages 25 being correspondingly tapered so that it may be driven tightly into position to prevent its coming loose. It is not necessary, however, that the pin, and passage cooperating therewith, be tapered, for if desired a pin which is not tapered may be used, and any other suitable means for holding it in position utilized. The housing 23 is provided with two wheel receiving pockets 30, the portion of the housing which contains the pocket or cup 22 being positioned between these two pockets. Each of these pockets is adapted to receive a wheel or roller 31. These wheels are mounted upon a single shaft or axle 32, which passes through suitable aligned openings 35 in the horns 33, which constitute that part of the housing forming the outside wall of the pockets 30, and an extension 34, which is carried upon that part of the housing which is between the two pockets 30. These passages 35 are preferably arranged to one side of the vertical axis of the stem 12, as illustrated.

The upper end of the housing, around the upper end of the pocket or cup is cut away to form a socket or recess 40, which, in a two wheel caster of the type shown in Figs. 1 through 5 is preferably substantially oval shaped, its greatest dimension being substantially parallel to the axis of the shaft or axle 32. Positioned within this socket or recess 40 is a washer or disc 41 which is substantially circular in shape, and which is provided with a central opening 42 adapted to snugly, but rotatably receive the stem 12. As shown in the drawing the effective length of the depending stem 12 and the pocket or cup 22 is such that when the caster is assembled with the hemispherical bearing end 20 of the stem seated upon its cooperating seat 21, the lower surface of the plate 10 will be held out of contact with the upper face of the housing 23. Inasmuch as casters of this type are used on trucks adapted to carry very heavy loads a construction which offers slight resistance to freedom of swivelling of the housing upon the stem is of extreme importance, and if the construction were such that the stem 12 could at any time contact with the housing 23 then considerable resistance to swivelling would occur as a result of the friction between these parts. Consequently the pocket or cup 22 is of such dimensions that relative tilting of the housing 23 and plate 10 may occur without the stem contacting in any way with the wall of this cup. And the socket or recess 40, and the washer or disc 41 positioned therein function to prevent such considerable movement of the stem 12, during relative tilting of the housing 23 and the plate 10, as will bring it into contact with the wall of the cup 22. As is clearly shown in Fig. 4, the cup 22, at its upper end, is preferably of substantially the same shape as the socket or recess 40. The disc 41 is circular in shape but its width is such that in any position the stem 12 cannot contact with the wall of the cup 22. As the plate 10 and housing 23 tilt relative to each other this tilting or rocking of the housing being, of necessity, about an axis perpendicular to the axis of the axle or shaft 32, the disc will slide within the socket 40, undue tilting being prevented since any considerable tilting will bring the disc into contact with the wall at one end or the other of the socket 40. Therefore, although tilting of the housing and plate 10 relative to each other is permitted, still undue movement of these two parts relative to each other is prevented and when in tilted position the parts of the caster are held with suitable rigidity.

In assembling the device the cup or pocket 22, is filled with lubricant, preferably some heavy grease. The disc 41 is then put in place after which the stem 12 is inserted through the opening 42 within that disc. As a result some of the grease is forced upwardly into the socket 40, and even completely out over the housing. The pin 24 is then placed in position to hold the device as thus assembled. And since the pin is in tight contact with the walls of the passages 25 there is substantially no leakage of this grease out of the pocket 22 and socket 40, after the device is once assembled. And as described in the previously referred to patent this grease serves not only to lubricate the bearing at the foot of the stem but also to prevent the ingress of dust and other foreign matter to the socket 40 and the pocket 22.

The housing 23 is preferably provided with a scraper plate 50, which is attached thereto in any suitable manner, preferably by means of screws 51, threadedly mounted within suitably threaded passages in the housing, which plate is adapted to closely overlie the surface of the rollers or wheels 31 to remove from the surface of these wheels during operation any matter which may collect thereon.

The horns 33 are preferably provided with stiffening or strengthening ribs 55, the lower ends of these ribs being cut off square. The axle or shaft 32 is shown as provided with a permanent head 56 at one end, which is flattened, as shown particularly in Figs. 1 and 3, to cooperate with the lower end of one of the ribs 55 to prevent rotation of the axle with the wheels during operation of the caster. The other end of the axle 32 is preferably provided with some conventional means for locking the shaft or axle in position, the means shown consisting of a pin 57, positioned within a passage through the end of the axle. Any other means for locking the axle in position, and for locking it against rotation during operation of the caster, may be used if desired.

As shown, no specific means is illustrated for lubricating the axle or shaft 32. If desired the hubs of the wheels 31 may be made hollow to provide grease cups which may be filled with any suitable type of grease. And because of the character of service to which casters of this type are put a cup or pocket sufficiently large to house sufficient grease for a long period of operation may be readily provided in the hubs without unduly weakening them. Or if desired the axle 32 may be provided with a longitudinal passage, adapted to receive grease from the pocket or cup 22 by means of a passage or groove connecting the interior of this cup 22 to the passage within the axle. This passage within the axle would, in this case, be provided with radial passages positioned to supply grease to the surface inside the hubs of the wheels.

As illustrated in Figs. 1 through 5 the recess 40 is substantially oval in shape with a circular ring 41 therein. This construction is not at all essential inasmuch as the device would function just as satisfactorily if the socket 40 is made with flat sides and arcuate shaped ends, and the ring or disc 41 is correspondingly shaped as shown in Fig. 6. Or if desired the pocket 40 may be rectangular in shape, and the disc or washer 41 either square or rectangular in shape. The precise shape of these parts being a matter of indifference so long as tilting of the housing and plate 10 relative to each other, is permitted while at the same time the parts are so constructed that the stem 12 will not contact with the wall of the pocket 22.

Figure 7:
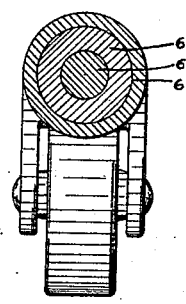
Fig. 7 is a sectional view, corresponding to the view shown in Fig. 4, but showing a single wheel caster embodying certain elements of the invention.
Figures 5, 6:
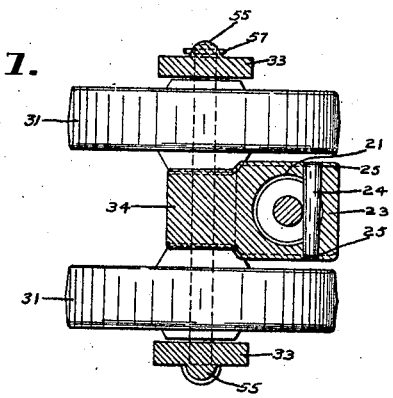
Fig. 5 is a horizontal sectional view through the lower part of the caster, along the line 5—5 of Fig. 2.
Fig. 6, is a sectional view through a slightly modified form of caster, the view being similar to Fig. 4.
Figure 2:
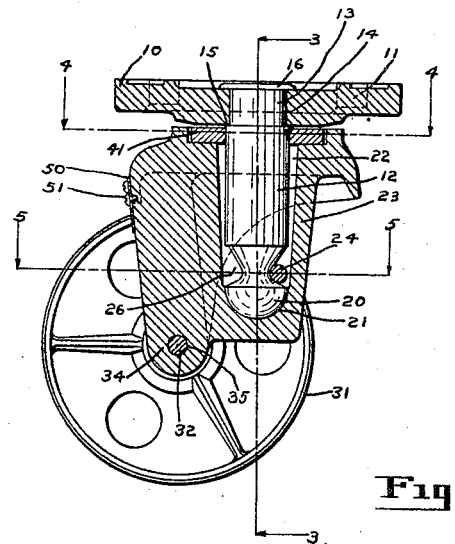
Fig. 2 is a vertical sectional view along the line 2—2 of Fig. 1.
Figure 3:
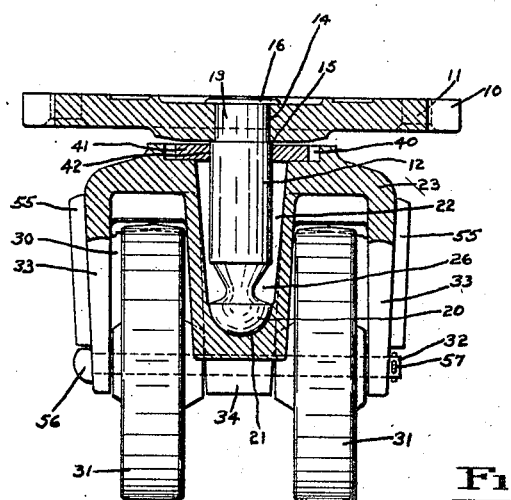
Fig. 3 is a vertical sectional view through the caster, in a different plane, this view being along the line 3—3 of Fig. 2.

In Fig. 7 is shown a modified form of construction, which consists of a single wheel caster. In this type of caster it is, of course, not necessary to provide means for permitting tilting of the housing carrying the wheel relative to the plate which is attached to the truck or piece of furniture. The caster shown in this modification is identical with that shown in the above referred to patent with the exception that the anti-friction rollers have been dispensed with and in their place a circular disc or washer 60 provided which is readily rotatable with respect to the stem 61 and also with respect to the wall of the socket or recess 62. This type of construction is sufficiently efficient for ordinary use and is more easily assembled than the series of anti-friction discs shown in the referred to patent.

While the forms of apparatus herein described constitute preferred embodiments of the invention, it is to be understood that the invention is not limited to these precise forms of apparatus, and that changes may be made in either without departing from the scope of the invention which is defined in the appended claims.

What is claimed is:

1. A caster, of the character described, comprising a plate, constructed for attachment to a truck or the like, a depending stem rigidly secured to said plate; a wheel bearing housing having a pocket or cup therein receiving the said depending stem, means for locking the housing and depending stem rotatably together, a wheel rotatably mounted upon said housing; said housing having an oval socket or recess therein surrounding the upper end of the said pocket or cup, and a substantially circular disc within said socket or recess having an opening therethrough receiving the depending stem, said disc being of a diameter substantially the same as the shorter diameter of the said socket or recess but substantially greater than the diameter of the upper end of the said pocket.

2. A caster, of the character described, comprising a plate, constructed for attachment to a truck or the like, a depending stem rigidly secured to said plate; a wheel bearing housing, having a pocket or cup therein receiving the said depending stem, means for locking the housing and depending stem rotatably together; a socket or recess within the said housing and surrounding the upper end of the said pocket or cup, and a disc within said socket or recess having an opening therethrough receiving the depending stem, said disc and socket being so proportioned as to permit tilting of the housing relative to the said plate, but to prevent the depending stem from contracting with the wall of the pocket or cup within the housing.

3. A caster, of the character described, comprising a plate, constructed for attachment to a truck or the like, a depending stem rigidly secured to said plate; a wheel bearing housing, having a pocket or cup therein constructed to receive the said depending stem, means for locking the housing and depending stem rotatably together; a plurality of wheels, rotatably mounted upon said housing, said housing having a substantially oval shaped socket or recess, the greatest diameter of which is substantially parallel to the axis of rotation of the said wheels, and a substantially oval disc or washer within said recess, having a centrally arranged opening constructed to receive the depending stem, the construction being such that the said disc is capable of movement, within the socket or recess, along its greatest dimension, but is substantially constrained from movement in any other direction.

4. A caster comprising a plate adapted to serve in securing the caster to a truck or the like, a stem rigidly secured to said plate and provided with a hemispherical lower end, a cup shaped housing arranged to be rotatably secured to said stem, said housing being provided with an oval counterbore around the rim of the cup and a hemispherical bearing for the lower end of said stem at the bottom of said cup whereby said plate is supported slightly above said housing, a circular ring disposed in said counterbore and contiguous to said plate whereby said ring is maintained in said counterbore by said plate, said ring being arranged to serve as a lateral bearing for said stem, in all positions of the stem, a tapered passage in the lower part of said cup, a tapered pin within said passage, the said stem having a groove adjacent its lower end to receive the said pin and hold the cup and stem in rotatable connection, the construction of the various parts being such as to retain grease within the said cup and exclude dirt therefrom horns on said housing and a floor wheel rotatably mounted between said horns.

5. A caster, of the character described, comprising a plate, constructed for attachment to a truck or the like, a depending stem rigidly secured to said plate; a wheel bearing housing, having a pocket or cup therein receiving the said depending stem, and positioned with its upper surface spaced from but closely adjacent to the lower face of the said plate, means for locking the housing and depending stem rotatably together, the construction being such that the said pocket or cup is adapted to receive and retain lubricant therein; a socket or recess within the said housing and surrounding the upper end of said pocket or cup, and a disc within said socket or recess having an opening therethrough receiving the depending stem, said disc being retained in place by means of the said plate, and the said disc and socket being so proportioned as to permit tilting of the housing relative to the said plate, but to prevent the depending stem from contacting with the wall of the pocket or cup within the housing, the said disc being also so positioned as to close the top of the said pocket or cup.

In testimony whereof I hereunto affix my signature.

FRANK A. BAUM.

Witnesses:
DONALD McDANIEL,
W. A. RUSHSTER.